United States Patent [19]
Czosnowski et al.

[11] Patent Number: 5,353,367
[45] Date of Patent: Oct. 4, 1994

[54] DISTRIBUTION FRAME AND OPTICAL CONNECTOR HOLDER COMBINATION

[75] Inventors: W. Michal Czosnowski, Pointe Claire; Michel J. Thomassin, Otterburn Park, both of Canada

[73] Assignee: Northern Telecom Limited, Montreal, Canada

[21] Appl. No.: 158,540

[22] Filed: Nov. 29, 1993

[51] Int. Cl.⁵ .................................. G02B 6/36
[52] U.S. Cl. .......................... 385/135; 385/134
[58] Field of Search ............... 385/135, 136, 137, 138, 385/139, 134; 439/49, 54, 709, 719; 361/428, 429

[56] References Cited
U.S. PATENT DOCUMENTS

| | | | |
|---|---|---|---|
| 4,792,203 | 12/1988 | Nelson et al. | 385/135 |
| 4,911,662 | 3/1990 | Debortoli et al. | 439/719 |
| 5,067,784 | 11/1991 | Debortoli et al. | 385/135 X |
| 5,071,211 | 12/1991 | Debortoli et al. | 385/135 X |
| 5,138,688 | 8/1992 | Debortoli | 385/135 |
| 5,167,001 | 11/1992 | Debortoli et al. | 385/135 |
| 5,265,187 | 11/1993 | Morin et al. | 385/135 |

*Primary Examiner*—John D. Lee
*Assistant Examiner*—Phan Thi Heartney
*Attorney, Agent, or Firm*—R. J. Austin

[57] ABSTRACT

Optical fiber distribution frame with optical test arrangement for locating both ends of a patchcord extending between optical connector holders. Each holder has an array of mounting position for optical connectors to which patchcord extend. Each patchcord also has a test fiber with ends directed outwardly from fronts of the holders in which the patchcord ends are housed.

7 Claims, 6 Drawing Sheets

DISTRIBUTION FRAME AND OPTICAL CONNECTOR HOLDER COMBINATION

This invention relates to distribution frame and optical connector holder combinations. In the optical telecommunications cable industry it is necessary to connect optical fibers of optical cable entering a customer's premises to optical fibers of a cable installed with the premises. In one general method of effecting such connections, optical fibers are interconnected by mechanical connectors mounted upon optical connector holders or trays. Such holders are, for convenience, sometimes stacked in one or more vertical banks in distribution frames. As examples of this, reference is made to U.S. Pat. Nos. 4,792,203 and 5,071,211. In the former patent a structure is described having a housing or frame in which the holders are pivotally mounted in two horizontally spaced vertical stacks. The holders in each stack are pivotally mounted at forward corners so as to be individually swingable between operative rearward positions within the frame and forward positions outside the front of the frame for accessibility of connectors and fibers which are stored by the holders. In U.S. Pat. No. 5,071,211, the holders are slidable fore and aft in distribution frames between operative rearward positions and forward positions for connector access. In the latter patent also, the holders are stacked in vertical banks which are horizontally spaced apart.

A vertical stacking arrangement for optical connector holders may be used conveniently for complete selective distribution of optical fibers by employing one of the banks as the incoming bank and the other bank as the outgoing bank. Thus, as described in U.S. Pat. No. 5,071,211 optical fibers of an incoming cable are connected to connectors mounted in holders in the incoming bank and optical fibers installed within a customer's premises are connected to connectors in holders in the outgoing bank. With such an arrangement, connectors of one bank are selectively interconnected to connectors of the other bank by patch cords. A problem which may result from this structure is that it may be difficult after installation to locate easily and quickly the other end of a patch cord one end of which has already been identified. Such a requirement is necessary in situations where it is desirable either to replace a patch cord or to change the positions of patch cords, i.e. to change the connectors which the patch cords interconnect. As may be seen this problem increases in difficulty as the number of patch cords increase. As the density of connector interconnections increases in an optical distribution frame, as is desirable, then there will be this increased difficulty in connector location. One example of increased density is that shown by the structure described in U.S. Pat. No. 5,071,211 in which it is possible in a distribution frame size of 84"×26" with holders having up to twelve connectors in each holder, to provide 1440 optical connectors in this space.

The present invention seeks to provide an optical fiber distribution frame and optical connector holder combination which will minimize the location problems referred to above.

Accordingly, the present invention provides a distribution frame and optical connector holder combination comprising: distribution frame means for receiving a plurality of optical connector holders; a plurality of optical connector holders receivable within the frame means, the holders having mounting means for positioning a plurality of optical connectors which, when mounted, have first ends which, in different holders are for selective optical interconnection from one connector to another and second ends for connection to optical fibers in the holders; and a plurality of optical patch cords each having a signal transmission optical fiber for the selective optical interconnection of first ends of the connectors, and a test means comprising a test optical fiber extending along the patch cord, the test optical fiber having light transmission and light receiving ends disposable in test locations in the holders carrying the selected connectors to enable the passage of light along the test optical fiber and provide an indication of the ends of the optical patch cord.

In a practical combination of the invention, in each connector holder mounting positions for the optical connectors extend in an array across the holder. In this arrangement, each holder has test locations corresponding to the mounting positions and located forwardly of the array of mounting positions. The test locations are also disposed to form an array with each test location and its corresponding mounting position being correspondingly disposed in their associated arrays. Also, with this arrangement in each optical patch cord the test optical fiber and the signal transmission optical fiber extend between end regions of the patch cord in close relationship and in the end regions the test optical fiber diverges from the signal transmission fiber. This enables an end of the test optical fiber to be located in a selected holder, in a test location spaced from the first end of a chosen connector held in a corresponding mounting position.

The invention also includes an optical patch cord having two ends with connector means at each end for connection to a mating connector means, a signal transmission optical fiber and a test optical fiber extending along the patch cord from end region to end region of the patch cord, and at each end region, the signal transmission optical fiber extends to the connector means and the test fiber diverges from the signal transmission optical fiber and has accessible ends for transmission at one end and identification at the other end of a test light signal to be passed along the test fiber.

One embodiment of the invention will now be described, by way of example, with reference to the accompanying drawings, in which.

Figure 1:
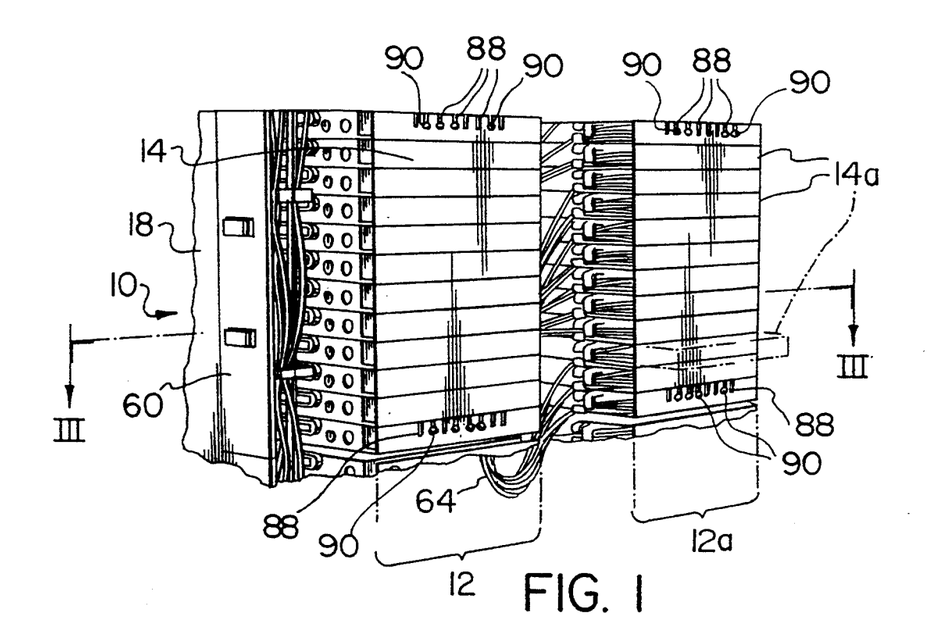
FIG. 1 is an isometric view of part of a distribution frame and optical connector holder combination.
Figure 2:
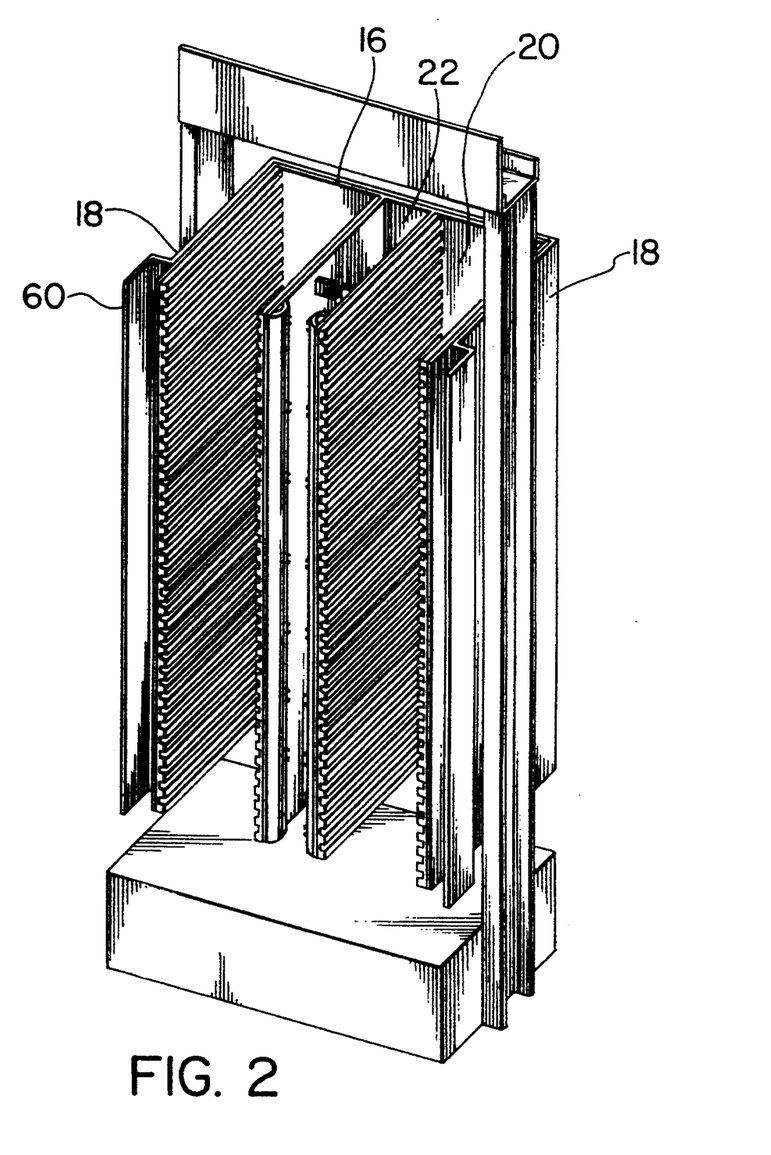
FIG. 2 is an isometric view of a supporting structure for holders within the distribution frame.
Figure 3:
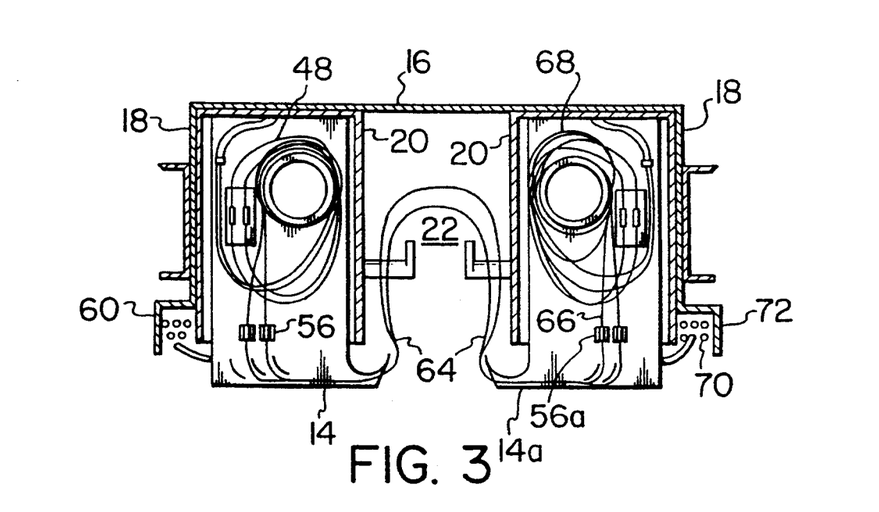
FIG. 3 is a cross-sectional view through the combination taken along line III—III in FIG. 1.

As shown in FIG. 1, in a distribution frame means and optical fiber holder combination, an optical fiber distribution frame 10 holds two vertical banks 12 and 12a of planar connectors for connecting a plurality of incoming optical fibers to outgoing optical fibers. The left-hand bank 12 accommodates holders 14 and the right-hand bank 12a has holders 14a. As shown in FIGS. 1, 2 and 3, the distribution frame comprises a rear wall 16, remote side walls 18 which extend from the rear to an open front of the frame. Between the side walls 18 are two other walls 20 which extend forwardly from the rear wall 16 and lie in parallel relationship to the side walls 18. For each bank 12, 12a, of connector holders 14, 14a, a side wall 18 and its corresponding wall 20 define between them receiving stations for the holders. The two walls 20 are spaced apart as shown in FIGS. 2 and 3 to provide a storage channel 22 for optical fibers leading from front end regions of connectors as will be described. The distance between the walls 20 is sufficient to ensure that where loops of fiber are to be disposed within the storage channel then these loops will not have a bend radius below a desired minimum. Each of the connector holders 14, 14a is insertable into a respective receiving station from the front of the distribution frame and is locatable in two positions in the respective station, i.e. in a rearward operative position as shown in FIG. 3 and in full outline in FIG. 1, and a forward connector access position as shown in chain-dotted outline for a holder 14a in FIG. 1. The arrangement of the holders in the distribution frame and the construction of the distribution frame is basically similar to that described in U.S. Pat. No. 5,071,211 granted Dec. 10, 1991 and entitled "Connector Holders and Distribution Frame and Connector Holder Assemblies for Optical Cable" in the name of G. Debortoli et al. The subject matter given in the above U.S. patent is incorporated into this disclosure by reference.

Each of the connector holders 14, 14a, is basically of the structure described in U.S. Pat. No. 5,067,784 granted Nov. 26, 1991 and entitled "Connector Holders" in the name of G. Debortoli, et al. The subject matter disclosed in this latter patent is also incorporated into this application by reference. While each of the connector holders 14, 14a, is constructed basically in the manner described in U.S. Pat. No. 5,067,784, a brief description of each holder will now be given.

Figure 4:
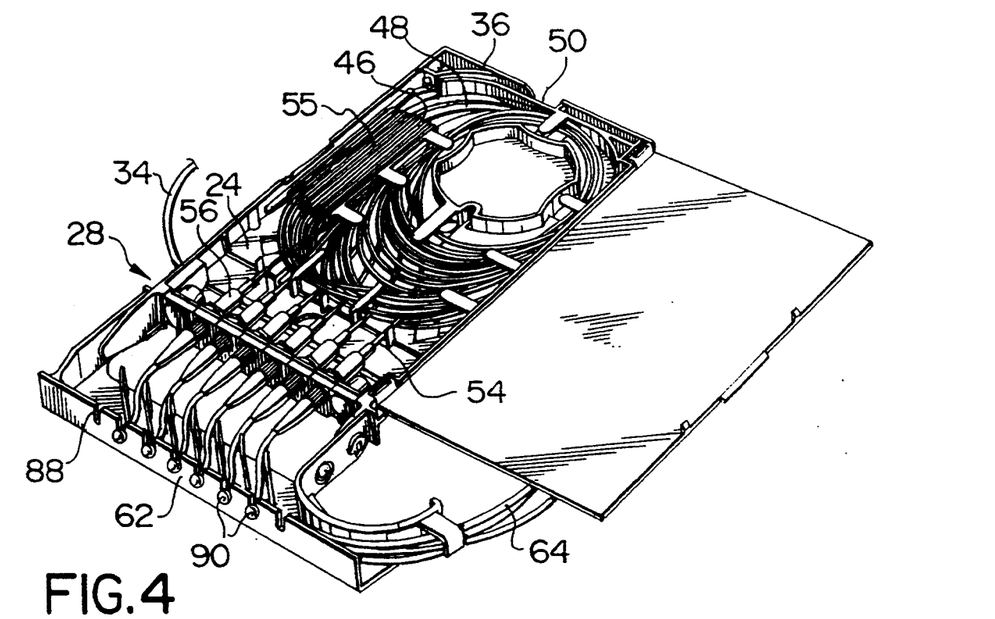
FIG. 4 is an isometric view to a larger scale than FIG. 3 of an upper side of a connector holder with a cover in an open position.
Figure 5:
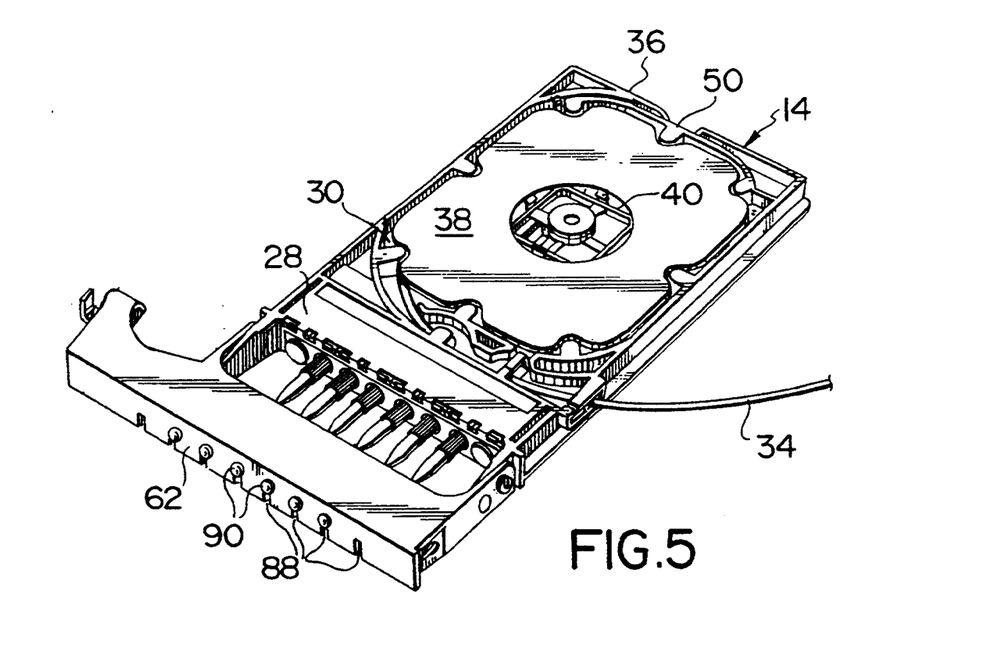
FIG. 5 is an isometric view upon the underside of the connector holder.
Figure 6:
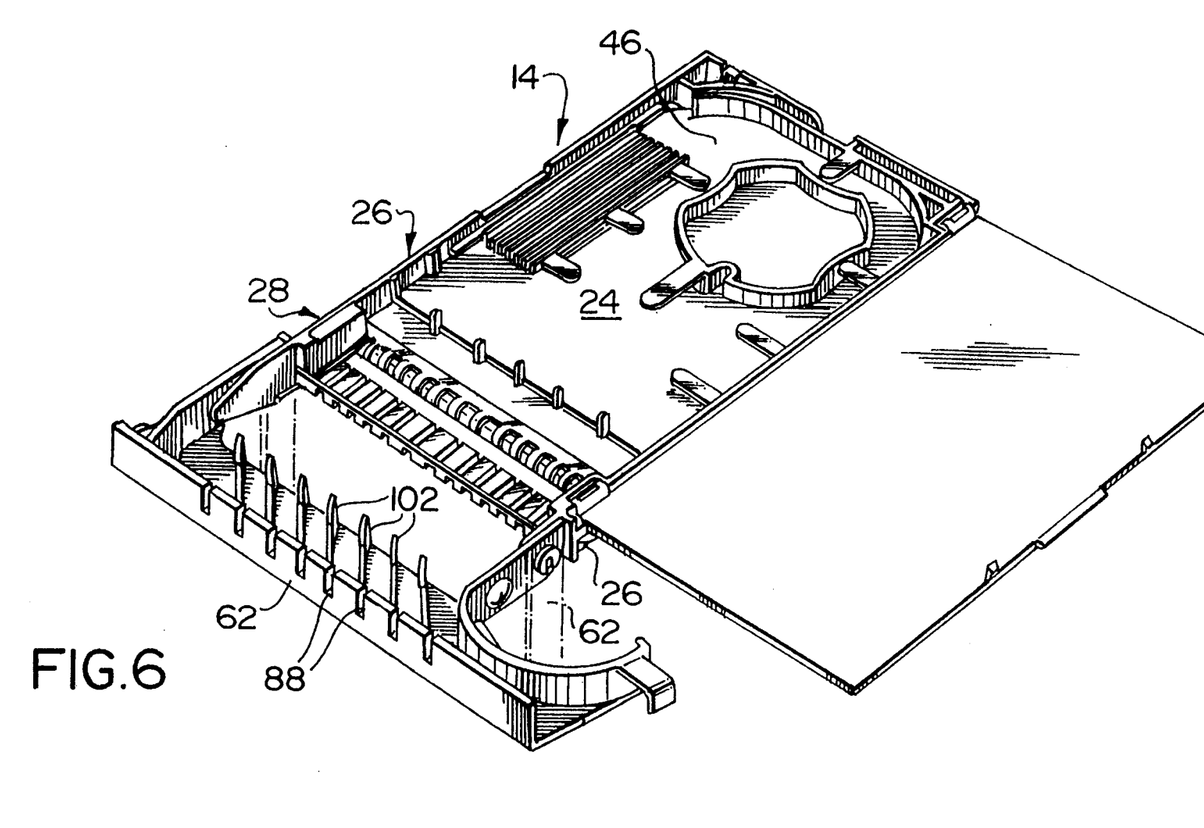
FIG. 6 is an isometric view similar to FIG. 4 but with connectors and optical fibers removed for clarity.
Figure 7:
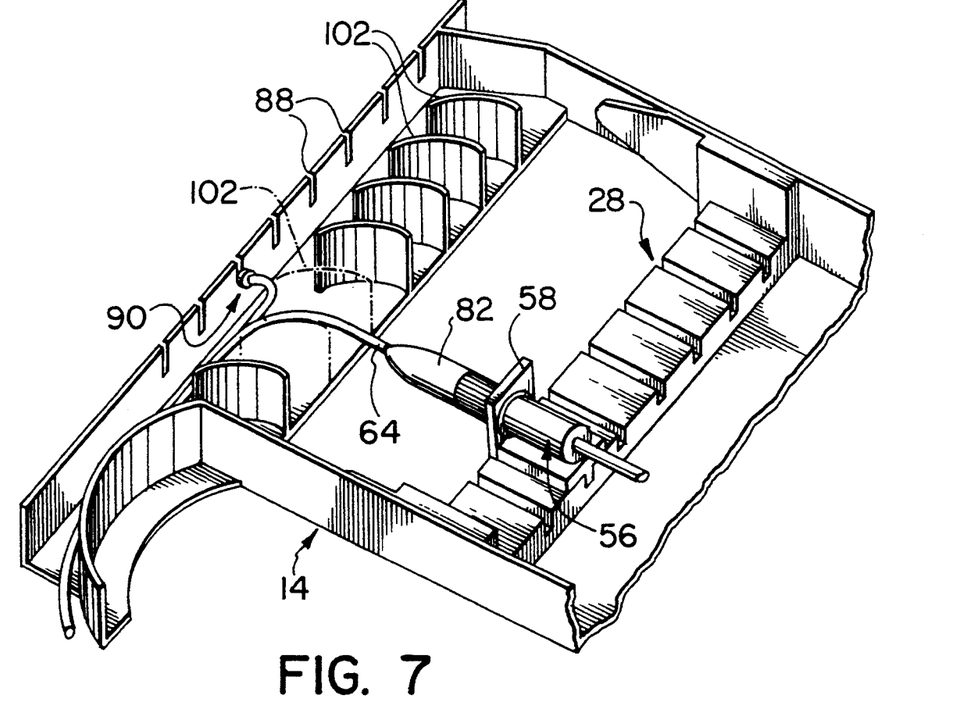
FIG. 7 is a rear isometric view of part of a connector holder and to a larger scale than in previous figures to show greater detail.

Each holder in the right-hand bank 12a is of opposite hand to those in the left-hand bank. In this description a holder 14 for the left-hand bank 12 will be description a holder 14 for the left-hand bank 12 will be described with the understanding that the holders 14a in the right-hand bank are of opposite hand. Each holder in the left-hand bank is planar. It has a planar base 24 (FIGS. 4 and 6). Side walls 26 extend to both sides of the base as shown. A mounting region 28 extends laterally across a front end region of the holder for optical connectors to be positioned therein (see particularly FIG. 6). As shown by FIG. 5 a storage compartment 30 is provided for incoming optical fibers 32 within a tube 34 which is one of a plurality of tubes forming the core of an incoming optical cable. The storage compartment 30 extends from the mounting region 28 to the rear end wall 36 of the holder. As disclosed in U.S. Pat. No. 5,067,784 a cover 38 is provided for the compartment 30, the cover being movable to allow for insertion of the tube 34 into the compartment 30. The tube passes around central structure 40 within the compartment 30, the structure 40 limiting the minimum diameter to which the tube may be reduced. As shown in FIGS. 4 and 6, a second compartment 46 on the other side of the base is for containing optical fibers 48 which extend from the tube 34 which passes from one compartment to the other through slot 50 provided for that purpose in the rear wall 36. The fibers 48 pass around an annular wall 52 which limits the minimum radius to which they may be formed. Pigtail fibers 54 also extend around the annular wall 52, the pigtail fibers and the fibers 48 being joined in a splice block 55 contained in the compartment 46. In assembled condition, the pigtail fibers 54 connect to rear ends of optical connectors 56 which are retained in mounts 58 which are mounted along the mounting region 28 (see particularly FIG. 4 and FIG. 7 which shows only one mount 58). The incoming cable is accommodated in a vertical channel 60 (see particularly FIG. 3). As shown particularly in FIGS. 4, 5 and 6, each holder 14 has a guard 62 extending forwardly from the mounting region, the guard being pivotally movable into a downwards location as shown chain-dotted in FIG. 6, in which location front ends of the connectors 56 are accessible for connecting patch cords 64 to the connectors. The patch cords will be described in greater detail below.

As mentioned previously, the right-hand bank of holders 14a is of opposite hand structure to the left-hand bank of holders 14. Connectors 56a in the right-hand bank as shown by FIG. 3, have pigtail fibers 66 connected to fibers 68 of a distribution cable 70 which extends up a vertical channel 72 adjacent to the right-hand bank 12a. The fibers 68 are accommodated in the right-hand bank of holders 14a in a similar manner to that for the fibers 48 in the left-hand bank as described.

In the fully assembled condition, the patch cords 64 extend from respective connectors 56 in the left-hand bank of holders 14 to respective connectors 56a selected as required in the right-hand bank. Hence, the patch cords terminations, from patch cord to patch cord may be at widely different height positions from one bank to the other, it being understood that the cross-sections on the left and right sides of FIG. 3 could represent different height positions. The patch cords are of substantially the same length and superfluous lengths of patch cords are accommodated by being looped into the storage channel 22 as described in U.S. Pat. No. 5,071,211.

As may be seen from the above description, with the complete assembly of frame, connector holders and patch cords, when it is required to change interconnections between connectors in the two banks of holders, this involves the tracing of individual patch cords from end to end to locate the connectors 56, 56a, at the ends of each patch cord. This may be an extremely difficult problem considering the amount of patch cords that may be extending at any one time between the two banks 12 and 12a. Even if connector identity designations are attached to front surfaces of the guards 62, it may still be a time consuming process to locate connectors.

To minimize the time involved and the possible tediousness in locating connectors, the embodiment includes test means which is operational for the purpose of quickly locating a corresponding connector at one end of a patch cord when a chosen connector has been located at the other end.

Figure 8:
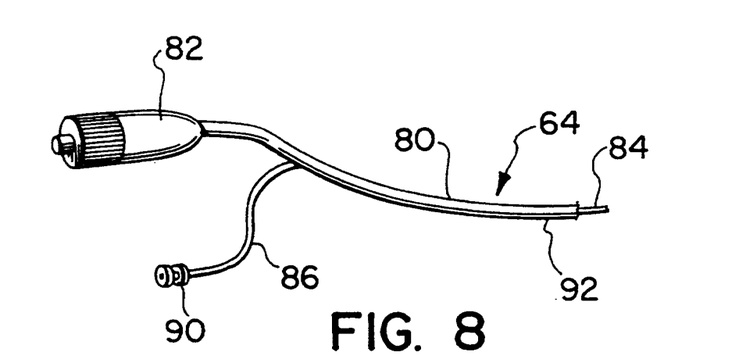
FIG. 8 is an enlarged isometric view of part of a patch cord included in the combination.

The test means is incorporated into the structure of each of the patch cords which will now be more fully described. As shown by FIG. 8, each patch cord 64 comprises an external flexible tubular member 80 extending from end to end of the patch cord, the ends comprising an optical connector 82 for connection to connected ends of connectors 56 and 56a. Within the tubular member 80 is contained a signal transmission optical fiber 84 which extends between and connects the connectors 82. Each optical patch cord also includes a test optical fiber 92 which may be contained in a protective sheath 86. The test optical fiber 92 extends side by side with the fiber 84 for most of the length of the patch cord 64, but at each end region of the patch cord the test fiber diverges outwardly from within the sheath 80 as shown by FIG. 8 in a position spaced from the corresponding connector 82. The test fiber and its surrounding sheath 86 are thus freely flexibly movable relative to the adjacent connector 82 from the position in which the sheath 86 with the contained test fiber projects from the tubular member 80.

Figure 9:
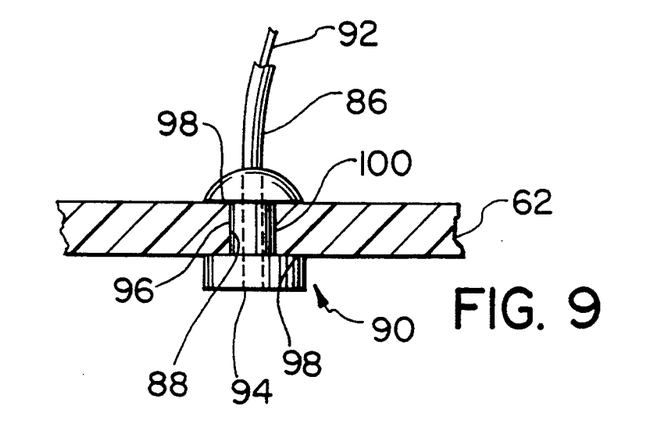
FIG. 9 is a top elevational view to a larger scale than in FIG. 8 of an end of a test means of a patch cord fitted into a test location of a connector holder shown in cross-section.

Each of the holders 14 and 14a is provided with test locations for disposing ends of the test fibers in a position visible from the front of the distribution frame when the patch cords 64 are in position. These test locations are provided by an array of slots 88 extending downwardly into the guard 62 of each holder, the slots being substantially in alignment from front to rear of each holder with respective mounts 58. This is shown in various figures and particularly in FIG. 7. For the purpose of accommodating each free end of the sheath 86 in a chosen test location, i.e. a chosen slot 88, each end of each sheath 86 is provided with an annular mounting member 90 (FIG. 9) to which the sheath extends, the mounting member being in the form of a light reflector which closely surrounds the test fiber 92 which enters the mounting member for reception and transmission of light from the outward end 94 of the member 90. As shown particularly in FIG. 9 the outside periphery of the member 90 is formed with an annular recess 96 providing spaced apart shoulders 98 and a central smaller diameter center section 100. To locate the end of a plastic sheath 86 in a test location, as shown by FIG. 9, the center section of the mounting member is slidably received in its respective slot 88 with the abutment shoulders 98 engaging opposite major surfaces of the guard 62 to entrap the mounting member in position.

Normally, in use, with holders 14 and 14a located within their operating positions in their respective receiving stations as described above and with reference to FIG. 1, a multiplicity of patch cords 64 extends between selected connectors 56 in the holders in the bank 12 to selected connectors 56a in the other bank 12a. If it is required to change positions of ends of patch cords or to remove patch cords for replacement purposes, it is a relatively simple operation to identify both ends of a patch cord once it has been selected. As may be seen, from FIG. 7 particularly, each of the patch cords enters from the gap 22 into a front of the connector directly behind the guard 62 the patch cords, the patch cords then being guided to their respective connectors 56 or 56a around arcuate guide walls 102 positioned directly behind the guide wall. As shown by the one example in FIG. 7, each of the connectors 82 is connected to a respective connector 56 or 56a in its mount 58 while the sheath 86 is flexibly positioned so that the end of the sheath, i.e. at the mounting member 90, is disposed within the slot 88 which corresponds along the array of the slots to the position along the mounting region 28 at which the connector 82 is located.

Upon one end of a patch cord 64 becoming known for replacement purposes, with the appropriate holder 14 or 14a being moved forward into its inoperative position (for instance as shown by the chain dot position 14a in FIG. 1) so that the connectors 82 in the holder may be seen. The connector position 82 along the mounting region 28 is quickly ascertainable and the sheath 86 with the mounting member 90 of that particular patch cord is located in its appropriate slot 88 in the guard 62. It is then possible to shine a light signal into the end of the test fiber 92 held by the member 90, the light passing along the test fiber and being visible at the other end of the test fiber in the holder 14 or 14a at which the other end of the patch cord is located. In this other holder, the connector 82 of the other patch cord lies in a position along the mounting region 28 which corresponds to the position of the mounting member 90 at the other end of the test fiber along the array of the slots 88 in that holder.

As may be seen therefore the above combination using patch cords as described with test fibers locatable in test locations at the front of each of the holders 14 or 14a, renders it a particularly fast operation to identify both ends of any particular patch cord which is required to be removed from the assembled distribution frame and holders.

Figure 10:
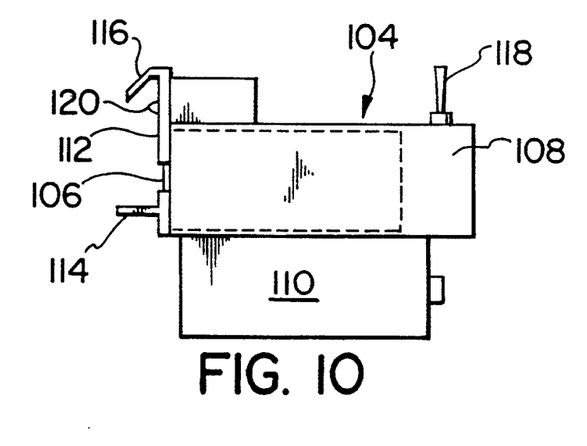
FIG. 10 is a side elevational view of a laser light generator for use with the test means.
Figure 11:
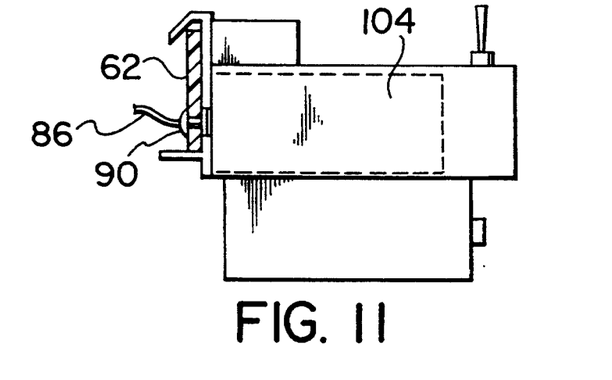
FIG. 11 is a similar view to FIG. 10 of the laser light source in use.

The light which is to be projected along any of the test fibers 92 may be provided by a source such as that shown in FIGS. 10 and 11. As shown in FIG. 10 a manually portable and manually operable laser light source 104 has a laser light aperture 106 provided at one end of a housing 108, the laser light being generated by a suitable battery 110 secured to the housing 108. At the end at which the outlet 106 is provided, a mounting member 112 is provided for mounting the laser light source onto any chosen guard 62. This mounting member is in the form of a mounting plate having a lower flange 114 extending outwardly normal to the main plane of the plate and an upper flange 116 extending downwardly at an acute angle to the plane of the plate. The source is provided with a manually operated switch 118 at a front end and an overriding limit switch 120 which projects through the mounting plate 112. The laser is inoperable unless the limit switch 120 is depressed. As shown by FIG. 11, the light source 104 may be mounted upon any particular guard 62 by sliding the plate 112 along the guard, the guard 62 being contained between the two flanges 114 and 116 with the inclined flange 116 holding the light source horizontal. The light source may be moved to any position along its associated guard 62 with the aperture 106 at such a position as to be aligned with any of the ends of the fibers 92 which are held along the test locations by that particular guard 62. Thus the light source 104 may be moved along its selected guard 62 to an appropriate position to shine laser light along any chosen test fiber 92. Clearly, therefore, upon one end of a patch cord 64 being located and with the holder 14 or 14a holding that particular end moved forwardly into its inoperative position, the corresponding test location of that patch cord is located and light may be shone along the test fiber 92, the other end of the test fiber then being illuminated in another holder 14 or 14a which contains the opposite end of the patch cord.

As may be seen therefore, the combination provides a quick and easy way of identifying both ends of a patch cord required to be removed. As described also, the structure of the patch cord which enables such an identification to be easily and quickly made, is of simple construction and relies upon the two ends of the patch cord each having a test fiber which projects outwardly to be freely movable so as to be located in a particular and special test location which is visible to anyone standing at the front of the distribution frame.

What is claimed is:

1. A distribution frame and optical connector holder combination comprising:

distribution frame means for receiving a plurality of optical connector holders;

a plurality of optical connector holders receivable within the frame means, the holders having mounting means for positioning a plurality of optical connectors which, when mounted, have first ends which, in different holders, are for selective optical interconnection from one connector to another, and second ends for connection to optical fibers in the holders and each holder the mounting positions for a plurality of optical connectors extend, in an array across the holder, the holder having test locations corresponding to the mounting positions located forwardly of the array of mounting positions, the test locations also being relatively disposed to form an array with each test location and its mounting position being correspondingly disposed in their associated arrays;

and a plurality of optical patch cords each having a signal transmission optical fiber for the selective optical interconnection of first ends of the connectors, and a test means comprising a test optical fiber extending along the patch cord, the test optical fiber having light transmission and light receiving ends disposable in test locations in the holders carrying the selected connectors to enable the passage of light along the test optical fiber and provide an indication of the ends of the optical patch cord.

2. A combination according to claim 1 wherein each holder has a flange formed with spaced slots providing the array of test locations and each of the patch cords has, at each end of its test optical fiber, means for mounting the test fiber end within a chosen slot.

3. A combination according to claim 2 including light source means for directing light into the end of a fiber disposed in a test location, the light source means having means for mounting it upon the flange and in a position for directing light along the fiber.

4. A combination according to claim 3 wherein the means for mounting the light source means coacts with the flange to enable the light source means to slide along the flange from one test location to another of the test location array.

5. A combination according to claim 2 wherein the means for mounting each test optical fiber end within a chosen slot comprises a mounting member surrounding the associated fiber end, the mounting member being slidable into and out of the chosen slot.

6. A combination according to claim 1 wherein in each optical patch cord, the test optical fiber and the signal transmission optical fiber extend between end regions of the patch cord in close relationship and, in the end regions, the test optical fiber diverges from the signal transmission fiber to enable an end of the test optical fiber to be located in a selected holder in a test location spaced from the first end of a chosen connector in a corresponding mounting position for receiving the associated end of the signal transmission fiber.

7. An optical patch cord having two ends with connector means at each end for connection to a mating connector means, a signal transmission optical fiber and a test optical fiber extending along the patch cord from end region to end region, a flexible tubular member extending from end-to-end of the patch cord and surrounding the signal transmission and test optical fibers, and at each end region the signal transmission optical fiber extending to the connector means and the test optical fiber diverging from the signal transmission optical fiber and passing through the tubular member to have an end portion extending from and being freely flexibly movable relative to the tubular member, the test optical fiber having accessible ends for transmission into one end of and identification at the other end of a test light signal to be passed along the test fiber.

* * * * *